April 21, 1925.
J. J. SHEA, JR
JOINT STRUCTURE
Filed Oct. 30, 1922
1,534,468
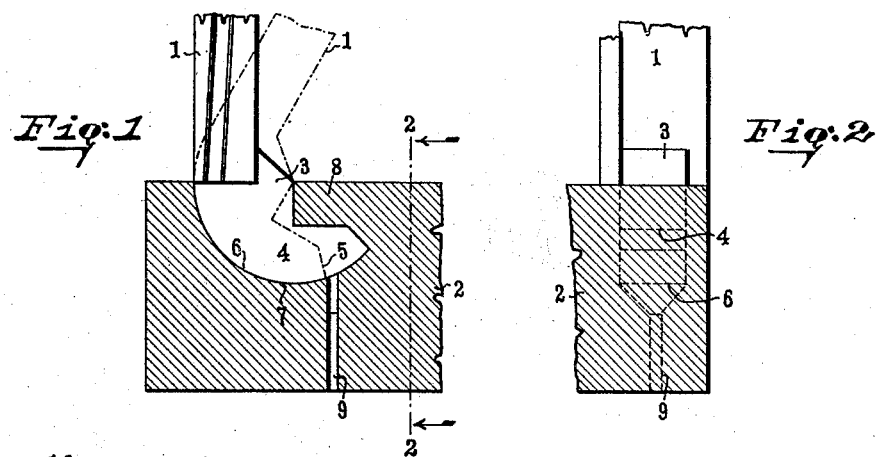
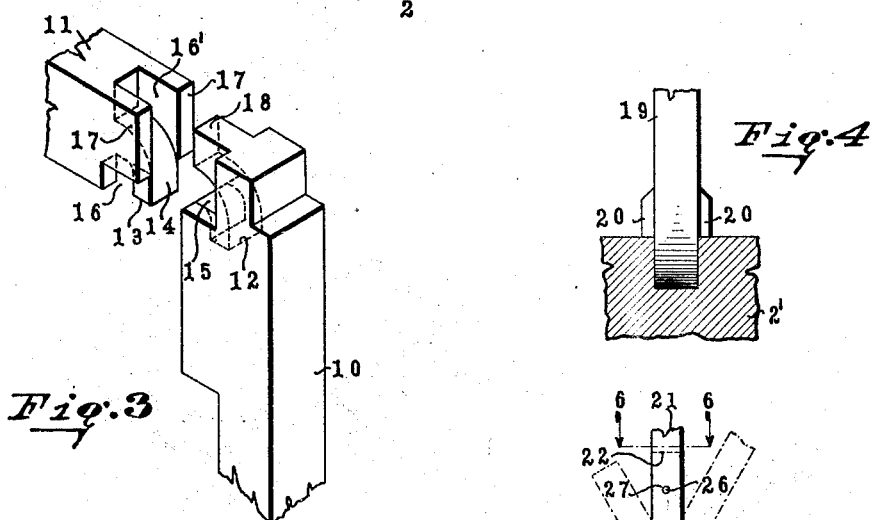
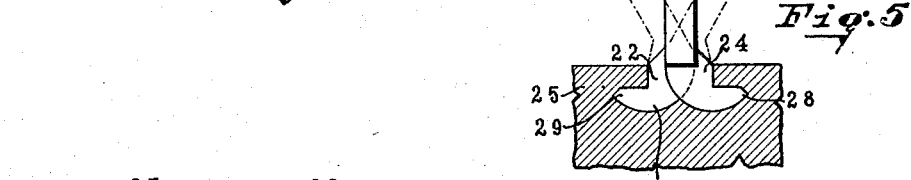
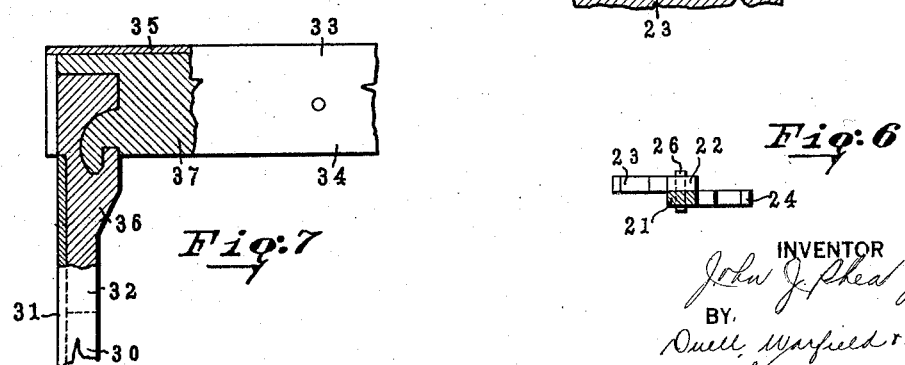
INVENTOR
John J. Shea Jr.
BY
Duell, Warfield & Duell
his ATTORNEYS Patented Apr. 21, 1925.

1,534,468

UNITED STATES PATENT OFFICE.

JOHN J. SHEA, JR., OF ELMHURST, NEW YORK.

JOINT STRUCTURE.

Application filed October 30, 1922. Serial No. 597,709.

*To all whom it may concern:*

Be it known that I, JOHN J. SHEA, Jr., a citizen of the United States, residing at Elmhurst, in the county of Queens and State of New York, have invented certain new and useful Improvements in Joint Structures, of which the following is a full, clear, and exact description, such as will enable others skilled in the art to which it appertains to make and use the same.

This invention relates to structural joints and more particularly to joints for use in collapsible structures of wood or metal. It is especially useful in connection with the construction of shipping containers, portable buildings of various descriptions, cars and furniture and the like.

It is an object of the invention to provide an improved form and arrangement of parts for a self-locking structural joint for rigidly supporting one structure or member at an angle with another and which is capable of easy assembly or disassembly.

Another object of the invention is to provide an improved form of structural joint by which co-operating members forming such joint may be firmly locked together to resist separation by tension in the members.

Another object of the invention is to provide a joint for use in collapsible structures such as are disclosed in the inventor's co-pending application, Serial No. 469,084, filed May 13, 1921, of which this application is a division.

Other objects will be in part obvious and in part pointed out hereinafter.

The invention accordingly consists in the features of construction, combinations of elements and arrangement of parts which will be exemplified in the construction hereinafter set forth, and the scope of their application will appear in the appended claims.

In the accompanying drawing forming a part of this application in which are shown several illustrative embodiments of the invention—

Figure 1 is a sectional view showing two members shaped to form the joint and indicating the manner of fitting the members together;

Fig. 2 is a sectional view of the embodiment shown in Fig. 1 along the line 2—2;

Fig. 3 is a modified form of the invention showing a joint adapted for use at a corner of a structure;

Fig. 4 is a fragmentary detailed view of a modification;

Fig. 5 is a sectional view showing a modification of the joint as adapted to be used for securing posts in position;

Fig. 6 is a sectional view of the post members of Fig. 5 shown on the lines 6—6; and Fig. 7 is a fragmentary detailed view of a modification in which the joint is used as a corner connection of two complementary members.

Referring to the drawing for a detailed description of the disclosed embodiment of the invention and particularly to Figs. 1 and 2, there is illustrated a form of construction adapted to secure a post 1 in position perpendicular to a sill 2 or similar member perpendicular or at an angle thereto. This joint comprises a tenon 3 formed on the end of the post 1 and which may be co-extensive in thickness with the thickness of the post and having a lateral inwardly extending projection or arm 4 with a terminal stop or toe 5. The outwardly disposed side of the tenon or that opposed to toe 5 is curved approximately on the arc of a circle as shown at 6, the tenon being preferably thickened adjacent its attachment to the post for stiffening the same as shown in Fig. 1.

The complementary recess or mortise 7 is provided in the sill 2 for receiving tenon 3 having an overhanging wall 8 overlying the lateral extension of the tenon and disposed in the angle between the latter and the thickened portion. The mortise is provided with a curved wall corresponding to the curved wall of the tenon and is otherwise formed to co-operate with the walls or faces of the tenon for supporting the latter securely in position. It will be seen that the arm 4 provides an interlock with the member 2, and that the projection or toe 5 provides a lug cooperating with the complementary lug formed by the inner terminal of the mortise 6 and by the ledge 8 to limit relative movement of the structural members 1 and 2 and to brace them in limited or final position. One or more drain apertures 9 may be provided leading downward from the mortise and permitting the escape of dirt, moisture or other foreign matter.

As shown in Fig. 3 a modification for a corner joint for two complementary members 10 and 11 may be formed in which the upper end of the member 10 is provided with a recess or mortise 12 somewhat similar in formation to mortise 7 having a downwardly extending recess for receiving a laterally offset toe 13 of the tenon 14. The wall 15 is disposed to overlie the offset portion or toe 13 to co-operate with the same to prevent removal of the member 11 except by a transverse swinging movement of the latter. This tenon is preferably formed by cutting away portions of the member 11 across the lower face thereof as indicated at 16, and cutting away a portion thereof above the tenon forming a mortise or recess as indicated at 16', lateral remaining portions providing walls 17 between which is received a complementary tenon 18 on the inner face of the upper end of the member 10 and spaced above mortise 12. These mutually engaging portions afford a joint especially rigid when assembled. It will be noted that the tenon 18 overlies tenon 14 when in assembled position and prevents disengagement of the parts by upward movement of the member, while movement thereof to the left is prevented by engagement of the overhanging wall 15 with the toe 13. It will thus be seen that a self-locking joint is provided incapable of disassembly except by swinging movement of the members with respect to each other. The terminals of the mortise 12 and 16' provide lugs or stops cooperating respectively with complementary lugs or stops provided by the terminals of the tenons 14 and 18, thereby functioning to limit relative movement of the members 10 and 11 and to brace them in final position.

In the modification shown in Fig. 4, the post 19 is provided with lateral blocks or braces 20 secured thereto near the base thereof, said braces having bottom shoulders adapted to engage the upper surface of a base structure 2' to support and brace the same against lateral stresses.

As shown in Figs. 5 and 6, the post 21 may be braced against movement in one direction by a supplementary brace member 22 disposed closely adjacent to the post and having a tenon 23 similar to the tenon 24 but faced in the opposite direction therefrom. The supplementary bracing member is adapted to be received in a complementary mortise in the base section 25 disposed contiguous to the mortise for the post 21. The two mortises are disposed side by side but face in opposite direction to receive the post and brace respectively.

The post 21 is engaged with the base structure by entering the tenon 24 and swinging from a dotted to a full line position as indicated in Fig. 5 in a manner similar to that above described. The brace member 22 is similarly engaged with its mortise by movement thereof from dotted to full line positions as shown in Fig. 5 in which its shank aligns with the post. A pin 26 is then slid into the aligned openings 27 in the post and brace respectively locking the two firmly together. The toes 28 and 29 of the post and brace respectively engage the extremities of the mortise and function to brace the post in opposite directions locking the latter firmly in position in the base structure. It will thus be seen that the post is rigidly braced in upright position in the base structure without employment of additional transverse bracing means. It will therefore be seen that this type of joint is well adapted for rigidly securing one or more posts or similar structures in position independently of other posts.

In the modified form of the invention shown in Fig. 7, the post 30 is a metallic channel having a web 31 and an inwardly directed flange 32. The complementary member with which the post 30 is to be joined is formed of a metallic channel member 33 having downwardly directed flanges 34 and a horizontal web 35. The joint members for connecting the complementary structural members are formed of a cast metal block 36 secured between the flanges of the posts 30, and cast metal block 37 secured between the depending flanges at the end of the member 33. It will be noted that the web 35 overlies the joint at the left in Fig. 7 providing an effective protection against moisture, dirt, etc.

The method of assembly is similar to that above described and need not be repeated here in detail.

Thus by the above construction are accomplished among others the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. A structural joint, including, in combination, a structural element having a mortise therein provided with a laterally disposed lug at one extremity thereof, a second structural element having a tenon with an offset lug for engagement with said first mentioned lug for relatively bracing said structural elements against swinging movement in one direction, and bracing means, including a mortise and tenon similar to said first mentioned mortise and tenon but being reversely arranged for bracing said structural elements against swinging movement in an opposite direction.

2. A structural joint, including in combination, a structural element having a mortise therein provided with a laterally disposed pocket or recess terminating in an offset lug, and being formed at its extremity and the side thereof opposing said offset lug with an arcuate surface extending continuously with constant curvature over said extremity and opposed side, a second structural element having a tenon with an offset lug and being formed at its extremity and side thereof opposite said lug with an arcuate surface of constant curvature complementary with said arcuate surface of the mortise, the arcuate formations of said mortise and tenon slidably engaging each other during assembly of the joint to guide the structural elements in relative swinging movement concentric with said arcuate surface and to bring the joint parts into interlocking position with the lug of the tenon in contact with the lug of the mortise to brace the elements against further swinging movement in engaging direction.

3. A structural joint, including, in combination, a plurality of structural elements having a mortise and a tenon adjacent thereto, a second structural element having a tenon and mortise complementary respectively with said first mortise and tenon, said respective mortises and tenons being engageable by relative swinging movement of the structural members and the respective tenons and mortises having interengaging lugs to limit relative swinging movement of the structural members and to brace the latter in final position.

In testimony whereof I affix my signature, in the presence of two witnesses.

JOHN J. SHEA, Jr.

Witnesses:
C. W. WEEKS,
M. A. CASHIN.